United States Patent
Krüper

[11] 3,870,031
[45] Mar. 11, 1975

[54] GAS HEATED GRILL DEVICE

[75] Inventor: Aloys Krüper, Menden, Germany

[73] Assignee: Firma Gebr. Cramer, Menden, Fingerhutsmuhle, West Germany

[22] Filed: Mar. 16, 1973

[21] Appl. No.: 342,138

[30] Foreign Application Priority Data
Mar. 24, 1972 Germany............................ 7211234

[52] U.S. Cl. ............................... 126/39 J, 126/41 R
[51] Int. Cl. ................................................. F24c 3/04
[58] Field of Search ......................... 126/41 R, 39 J

[56] References Cited
UNITED STATES PATENTS

| | | | |
|---|---|---|---|
| 1,699,624 | 1/1929 | O'Dowd............................ | 126/39 J |
| 2,578,227 | 12/1951 | Chambers.......................... | 126/41 R |
| 2,668,527 | 2/1954 | Chambers.......................... | 126/41 R |
| 2,903,549 | 9/1959 | Joseph.............................. | 126/41 R |
| 3,103,160 | 9/1963 | Forniti et al....................... | 126/41 R |
| 3,470,862 | 10/1969 | Darrow et al...................... | 126/39 J |
| 3,494,350 | 2/1970 | Perl................................... | 126/39 J |
| 3,525,325 | 8/1970 | Perl................................... | 126/39 J |
| 3,593,647 | 7/1971 | Copeland, Jr...................... | 126/41 R |
| 3,606,612 | 9/1971 | Reid, Jr............................. | 126/39 J |
| 3,628,902 | 12/1971 | Huebler............................. | 126/39 J |

Primary Examiner—Carroll B. Dority, Jr.
Assistant Examiner—W. E. Tapolcai, Jr.
Attorney, Agent, or Firm—Allison C. Collard

[57] ABSTRACT

A gas heated grill device comprising in combination a central burner pipe, a metal screen mounted over the burner pipe which emits infrared rays when directly heated by the gas flames, and, a cooking plate disposed over the metal screen for supporting and heating a cooking utensil.

4 Claims, 5 Drawing Figures

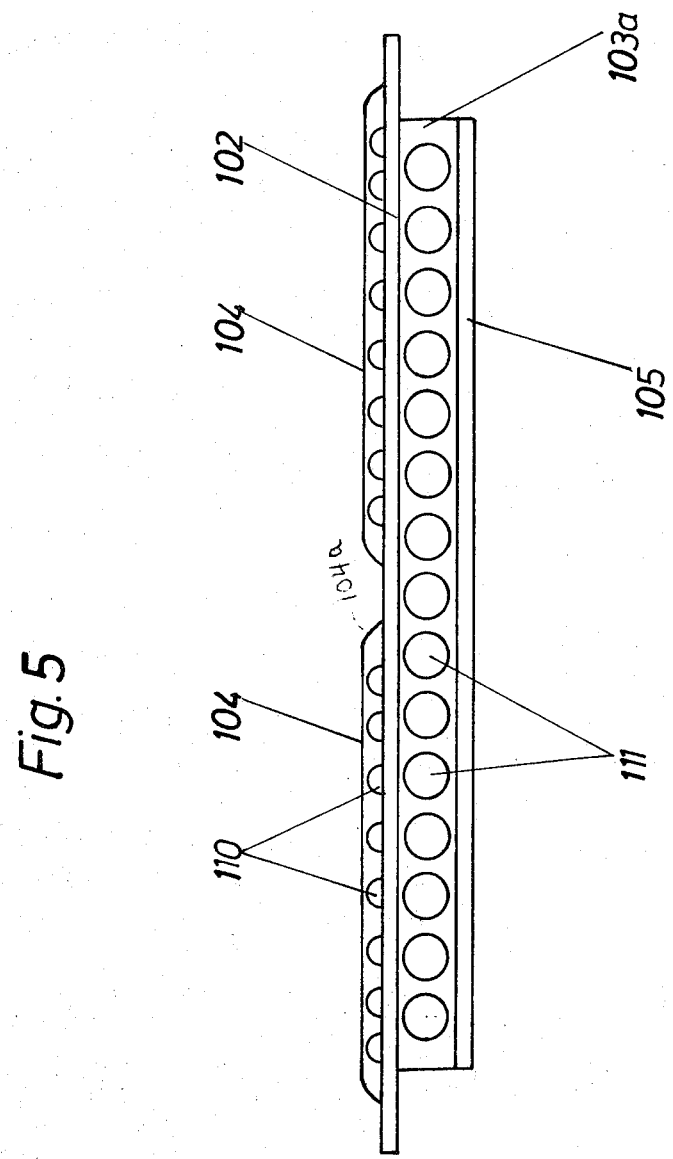

GAS HEATED GRILL DEVICE

The invention relates to a gas heated grill device having a central burner pipe above which is disposed a metal screen. The metal screen radiates heat in the infrared ray range or zone of the spectrum.

Infrared grill devices are known, for instance, they are used in the garden, in the home, and for camping. Despite the metal screen and additional deflector plates, a portion of the gas heat which moves upwardly, is lost. In the invention this lost heat is used by an additional cooking device which complements the grill device. Accordingly, a cooking plate is added above the metal screen.

The metal screen of the invention may be supported by a laterally angled deflector steel plate. This plate is mounted in engagement with the cooking plate. The burner pipe is held to the cooking plate by one or a plurality of screws. In a preferred embodiment of the invention, a plurality of openings are provided around one or a plurality of cooking areas integrally formed within the cooking plate.

The present invention utilizes a circumferential angled cooking plate made of deep-drawn quality sheet steel. Openings are bored or stamped into the slope of the raised portion of the cooking places. These openings may be arranged around the cooking area. The metal screen which is underneath the cooking plate is supported by two angular sheet metal plates. Bores may be provided in the vertical portion of these angular sheet metal plates.

The advantage of this cooking plate is that the upwardly moving hot air escapes through the openings which are in the immediate area of the cooking places and heats a cooking utensil. The upwardly moving heat which escapes through the openings, heats the cooking utensils as if by flame heat. This greatly improves the efficiency of gas heated cooking devices.

In the present invention, the cooking plates are made out of deep drawn quality sheet metal and there is no distortion of the cooking area despite the high degree of heat stress. Furthermore, the stability of the cooking areas is increased when they are made of deep drawn quality sheet metal plates.

In prior cooking grills no additional cooking device or space was provided. In these prior devices the upwardly moving heat exits the edge zones of the cover plate of the housing. To utilize this lost heat in accordance with the inventive concept, an even or planar cooking plate having the specially arranged cooking areas, is placed over the upwardly moving heat. Thus, the heat which is usually lost can be used for preparing other types of food.

In order to increase the effectiveness of the cooking plate, that is, to increase its heating effect, two spaced-apart metal screens are mounted above the burner pipe. In this embodiment one or a plurality of additional nozzles are provided in series in the space between the two screens allowing direct heating of the cooking plate. The metal screens may be supported by laterally angled deflector plates.

It is therefore an object of this invention to provide a gas heated grill with an additional cooking area which more fully utilizes the heat generated.

It is another object of the present invention to provide a gas heated grill which is simple in design, efficient in operation and inexpensive in cost.

Other objects and features of the present invention will become apparent from the following detailed description considered in connection with the accompanying drawings which disclose the embodiments of the present invention. It should be understood, however, that the drawings are designed for the purpose of illustration only and not as a definition of the limits of the invention to which reference should be made to the appended claims.

In the drawings, wherein similar reference characters denote similar elements throughout the several views:

FIG. 5 is a side view of the cooking plate according to FIG. 3.

Figure 1:
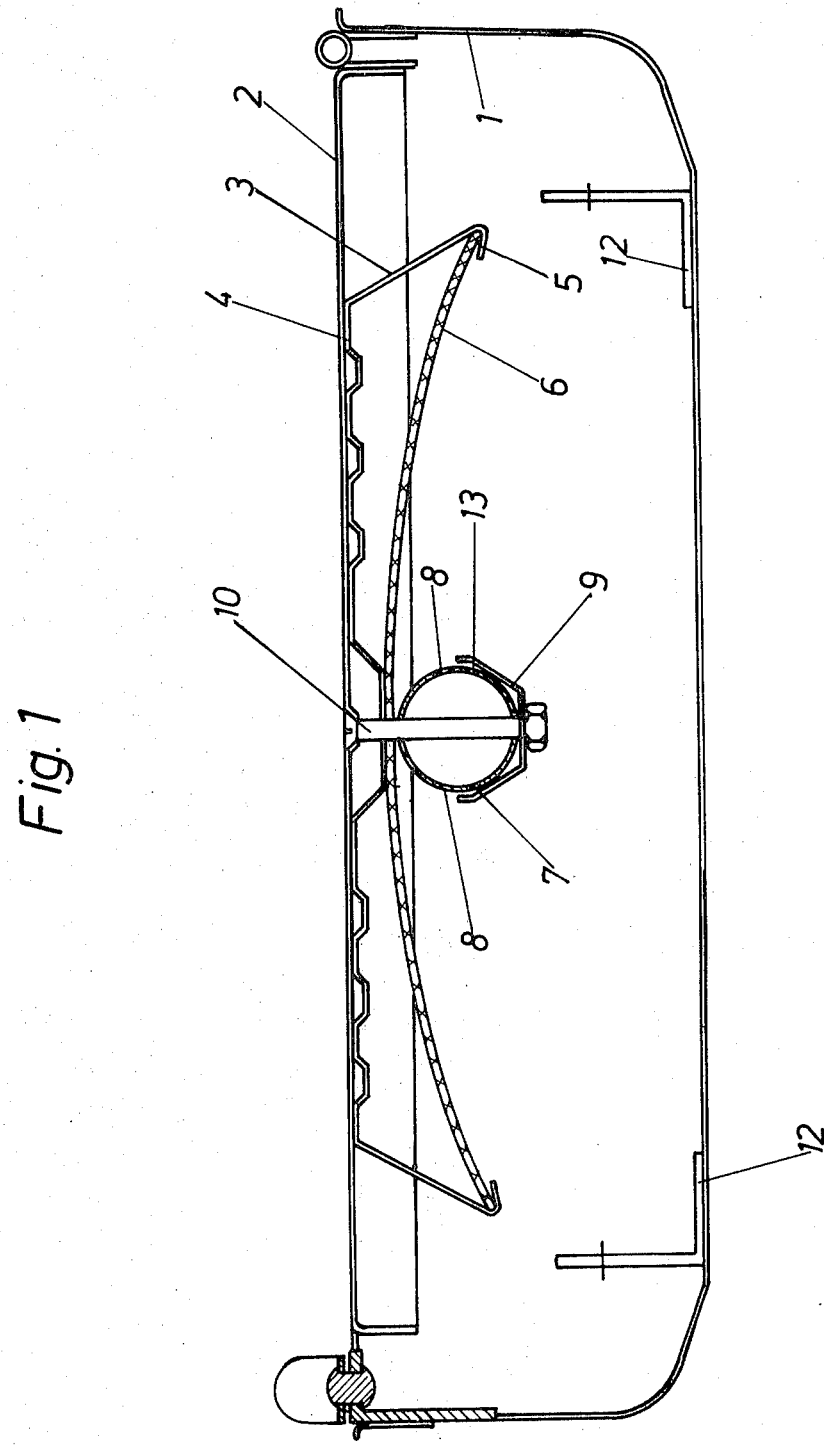
FIG. 1 shows one embodiment, in cross section, of a gas heated grill according to the present invention having an associated cooking plate and metal screen with a deflector plate.

Referring now to FIG. 1, an even or planar cooking plate 2 is mounted on a housing 1. A laterally angled deflector plate 3 is mounted with its rearward side 4, immediately underneath the cooking plate 2 in engaged relationship therewith. A metal screen 6 is supported between angles 5 of the deflector plate 3. The metal screen 6 directs infrared heat downwardly. A burner pipe 7 is held centrally under the metal screen 6 and the cooking plate 2 by means of a screw 10 which extends through cooking plate 2. The mounting of the burner pipe may also be done in other ways, as is common in the art. Burner pipe 7 is encompassed from below by a U-shaped cup having a plurality or series of nozzles 7 and 13. The plurality of nozzles 8 which are provided above the auxiliary cup 9 serve to heat the metal screen 6. Support angles 12 for a grill pan are provided under the grill within housing 1.

In the operation of the grill device, the flames (not shown) of nozzles 8 are directed to the metal screen 6 which may consist of a suitable material. The largest portion of the heat is directed downwardly onto the grill pan by metal screen 6 in the form of infrared rays. However, a portion of the heat from the metal screen 6, as well as from the gas flames, moves upwardly. This is in addition to the return heat from the grill pan and the grill housing. This heat is used to heat cooking plate 2. It has been shown that this heat is sufficient to cook food in the vicinity of cooking plate 2.

Figure 2:
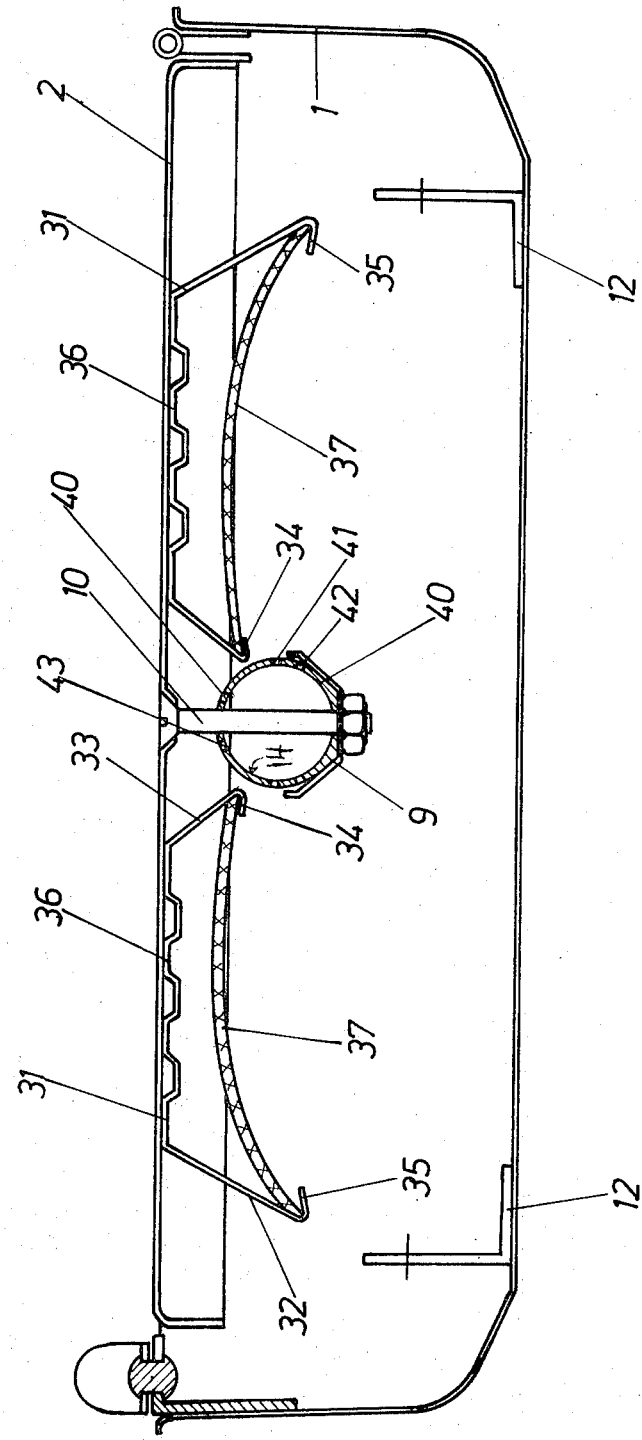
FIG. 2 shows another embodiment, in cross section of a grill device according to the present invention, having two metal screens and an additional heat source for direct heating of the cooking plate.

Referring now to FIG. 2, there is shown another grill device according to the present invention in which an additional direct heating of cooking plate 2 is provided. In this embodiment, two metal screens 37 are mounted above burner pipe 14 and are spaced apart from each other. These two metal screens direct the heat which consists of infrared rays downwardly when produced by the gas flames of nozzles 41. The metal screens are supported by deflector plates 31 having inner and outer angles 32 and 33, whereby the angular bends 35 and 34 support the metal screens. The rearward portion 36 of the deflector plates are in engaged relationship with the underside of cooking plate 2.

Two additional upper rows or series of nozzles 43 are provided on burner pipe 40. Thus, the gas flames are directed to cooking plate 2 in the space between the two metal screens 37. This direct admittance of heat to the cooking plate assures a faster cooking of food on the cooking plate.

Figure 3:
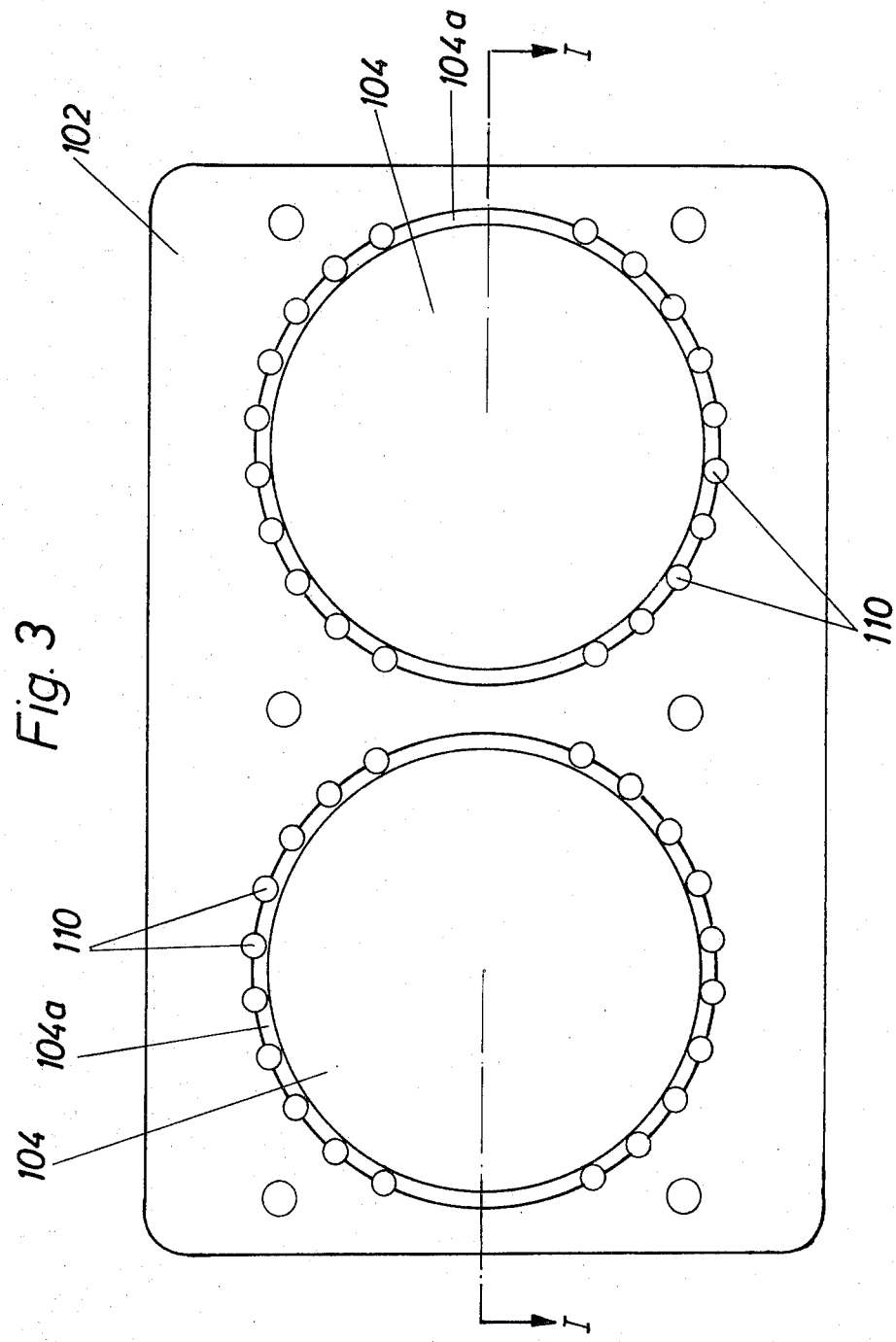
FIG. 3 shows a further embodiment of a cooking plate and the cooking areas according to the present invention, in plan view.
Figure 4:
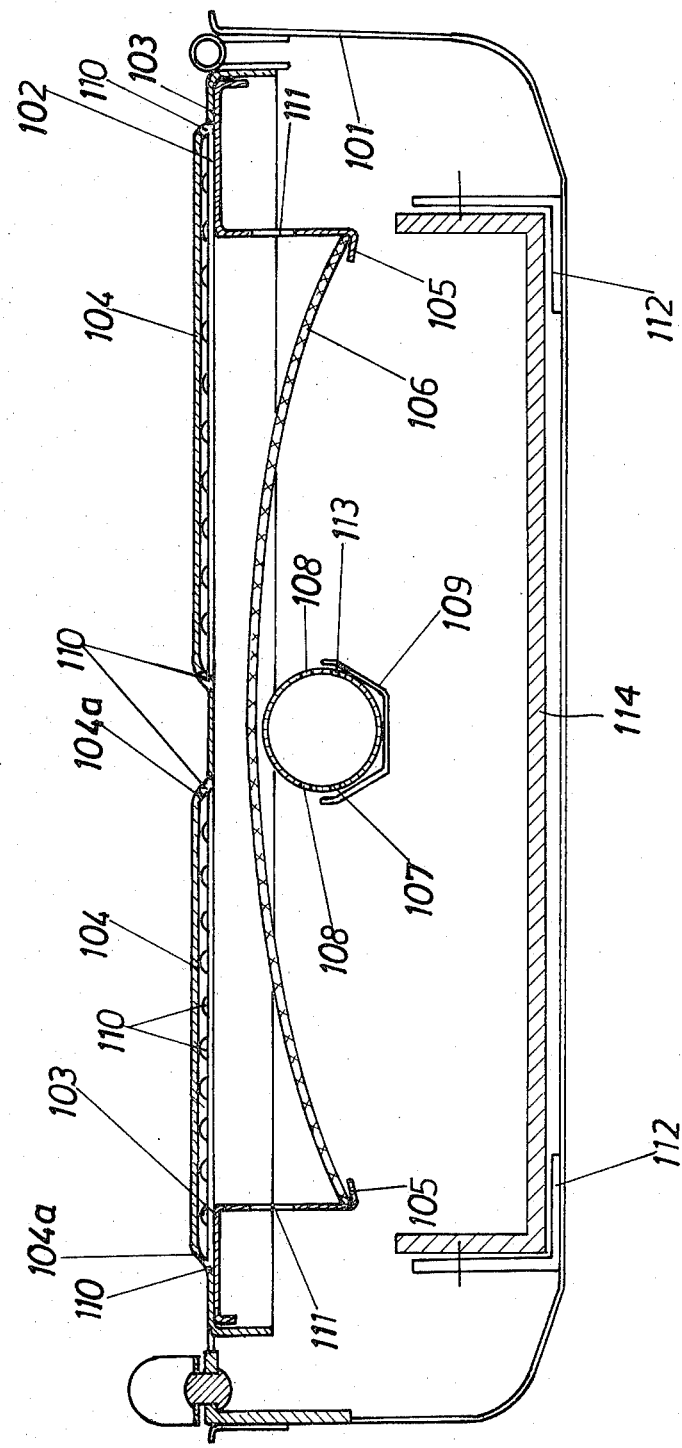
FIG. 4 is a sectional view taken along line I—I of FIG. 3.

FIGS. 3, 4 and 5 show a gas heated grill device without deflector plates according to another embodiment of the present invention. In this embodiment a cooking plate 102 consists essentially of two deep-drawn quality sheet metal cooking areas 104 each of which is inserted into grill housing 101. Two lateral angular plates 103 having lower angles 105 are mounted underneath the cooking plate 105. A metal screen 106 is supported between angles 105 and radiates infrared rays downwardly when directly heated by the gas flames (not shown). A burner pipe 107 is centrally mounted under metal screen 106 and the cooking plate 102. As common in the art the lower portion of the burner pipe 107 is encompassed by a U-shaped auxiliary gas cup 109 having a series of nozzles 113 on burner pipe 107. To heat the metal screens, a plurality of nozzles 108 are provided on burner pipe 107 above auxiliary gas cup 109 through which the gas travels and ignites. A supporting angle bracket 112 is provided under the grill area as shown, within grill housing 101 for supporting a grill pan 114.

When operating the grill device according to the present invention, the flames of the nozzles 108 are directed to the metal screen 106. Metal screen 106 may comprise any suitable material. A portion of the heat from metal screen 106 as well as from the gas flames (not shown) move upwardly in addition to the reflected heat rays from the grill pan (not shown) and grill housing 101. This heat heats cooking plate 102 with the associated sheet metal cooking areas 104. As understood from FIGS. 3 and 5, the hot air escapes through openings or apertures 110 in sloping edge 104a of cooking areas 104. This heats the cooking utensil similarly to flame heat. Accordingly, a fast heating of the cooking utensil and the food therein is obtained.

The openings 110 or corresponding holes in the cooking plate 102 should preferably be grouped around the cooking areas. It may be advantageous to arrange the openings in closer or wider arrangement with respect to each other. However, whatever the arrangement, it should be noted that the hot air is guided or directed as closely as possible to the cooking utensils. A plurality of bores 111 are provided in angular plates 103 underneath cooking plate 102 thereby enhancing the air circulation upwardly. They should be arranged in the vicinity of the cooking area.

While only a few embodiments of the present invention have been shown and described, it will be obvious to those persons skilled in the art that many changes and modifications may be made thereunto without departing from the spirit and scope of the invention.

What is claimed is:

1. An improved gas heated grill device comprising in combination:

a housing having at least one cooking plate adapted for cooking in utensils, said cooking plate including a plurality of spaced-apart openings around its cooking area formed in a sloped edge of the plate;

a grill pan located below said cooking plate;

a gas burner located in said housing between said cooking plate and said grill pan, a metal screen disposed between said burner and said at least one cooking plate, said burner being provided with nozzles disposed for the direct heating with flames of said screen to produce infrared rays, said screen being constructed and arranged for radiating infrared heat simultaneously in two principal directions, downwardly toward said grill pan and upwardly toward said cooking plate, and a pair of spaced apart lateral brackets depending from the cooking area and having angular arms for supporting the edge of said screen, said brackets including bores for enhancing the air circulation upwardly toward the opening of the cooking plate.

2. A grill device according to claim 1, wherein said cooking plate is fabricated from deep-drawn sheet metal and has inclined edges into which the plurality of openings are disposed therethru.

3. A grill device according to claim 1, wherein said cooking plate is integrally formed with a housing.

4. A grill device according to claim 1, wherein said device is portable and screen is a metal screen.

* * * * *